United States Patent
Lee et al.

(10) Patent No.: US 10,895,890 B2
(45) Date of Patent: Jan. 19, 2021

(54) HEAD MOUNTED DISPLAY HAVING FRONT CASE INCLUDING COVER AND SUPPORT PART WITH A PLURALITY OF RIBS FORMING A PLURALITY OF HOLES

(71) Applicant: LG ELECTRONICS INC., Seoul (KR)

(72) Inventors: Haklim Lee, Seoul (KR); Jongbeom Han, Seoul (KR); Sanghyuk Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/486,145

(22) PCT Filed: Feb. 16, 2017

(86) PCT No.: PCT/KR2017/001716
§ 371 (c)(1),
(2) Date: Aug. 14, 2019

(87) PCT Pub. No.: WO2018/151350
PCT Pub. Date: Aug. 23, 2018

(65) Prior Publication Data
US 2019/0361488 A1    Nov. 28, 2019

(51) Int. Cl.
*G06F 1/16* (2006.01)
*H04R 1/10* (2006.01)

(52) U.S. Cl.
CPC ........... *G06F 1/163* (2013.01); *H04R 1/1016* (2013.01); *H04R 1/1041* (2013.01); *H04R 1/1058* (2013.01); *H04R 2499/15* (2013.01)

(58) Field of Classification Search
CPC ..... G06F 1/163; H04R 1/1058; H04R 1/1041; H04R 1/1016; H04R 2499/15; G02B 27/01; G02B 27/017; G02B 2027/0178
See application file for complete search history.

(56) References Cited

U.S. PATENT DOCUMENTS

2013/0300949 A1* 11/2013 Yamamoto ........... G02B 27/017
348/800
2016/0062125 A1    3/2016 Baek et al.
(Continued)

FOREIGN PATENT DOCUMENTS

CN        106019597      10/2016
EP          300874       4/2016
(Continued)

OTHER PUBLICATIONS

PCT International Application No. PCT/KR2017/001716, International Search Report dated Nov. 16, 2017, 2 pages.
(Continued)

*Primary Examiner* — Rodney Amadiz
(74) *Attorney, Agent, or Firm* — Lee, Hong, Degerman, Kang & Waimey (57) ABSTRACT

The present invention provides a head mounted display comprising: a rear case for accommodating a lens part; a front case, which is coupled to the rear case, forms an exterior, and includes an open part; a fixing part, which performs a particular function, has one end mounted on the rear case so as to prevent the separation of the rear case from the front case, and passes through the open part so as to be exposed to the outside; and a controller, wherein the controller generates a control command through the fixing part or controls the fixing part such that data is outputted, and the front case is made of polypropylene (PP) or polycarbonate (PC).

16 Claims, 9 Drawing Sheets

(56) References Cited

U.S. PATENT DOCUMENTS

| | | | | |
|---|---|---|---|---|
| 2016/0062454 | A1* | 3/2016 | Wang | G06F 3/012 345/633 |
| 2016/0128217 | A1* | 5/2016 | Yoo | H04M 1/0274 361/731 |

FOREIGN PATENT DOCUMENTS

| | | |
|---|---|---|
| KR | 20150059085 | 5/2015 |
| KR | 20150099010 | 8/2015 |
| KR | 20160052189 | 5/2016 |
| KR | 101635892 | 7/2016 |
| KR | 20160120602 | 10/2016 |
| WO | 9829775 | 7/1998 |
| WO | 2016182974 | 11/2016 |

OTHER PUBLICATIONS

European Patent Office Application Serial No. 17896798.0, Search Report dated Oct. 26, 2020, 8 pages.

* cited by examiner

HEAD MOUNTED DISPLAY HAVING FRONT CASE INCLUDING COVER AND SUPPORT PART WITH A PLURALITY OF RIBS FORMING A PLURALITY OF HOLES

CROSS-REFERENCE TO RELATED APPLICATIONS

This application is the National Stage filing under 35 U.S.C. 371 of International Application No. PCT/KR2017/001716, filed on Feb. 16, 2017, the contents of which are all hereby incorporated by reference herein in its entirety.

TECHNICAL FIELD

The present invention relates to a head mounted display capable of moving and rotating a display unit while with it on a head portion.

BACKGROUND ART

Terminals may be divided into glass-type terminals (mobile/portable terminals) and stationary terminals according to mobility. Also, the glass-type terminals may be classified into handheld types and vehicle mount types according to whether or not a user can directly carry.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

A wearable glass type terminal which is wearable on a part of a human body is recently developed. A glass type terminal worn on a user's head may correspond to a head mounted display (HMD). A display unit 151 provided in a glass type terminal such as an HMD may provide various conveniences to a user by combining with an augmented reality technology, an N-screen technology and the like beyond a simple image output function.

However, a heavy-weighted head mounted display is not suitable for being stably fitted to a user's head, and is inconvenient to use as it is worn on the user's head.

DETAILED DESCRIPTION OF THE DISCLOSURE

One aspect of the present invention is to provide a lightweight head mounted display capable of being stably fixed to a user's head while being easy to use.

In order to achieve the aspect of the present invention, there is provided a head mounted display (HMD), including a rear case for accommodating a lens part, a front case coupled to the rear case, forming an exterior, and provided with an open (opening) part, a fixing part, which performs a particular function, has one end thereof mounted on the rear case so as to prevent separation of the rear case from the front case, and passes through the opening part so as to be exposed to the outside, and a controller, wherein the controller is configured to generate a control command through the fixing part or control the fixing part such that data is outputted, and the front case is made of polypropylene (PP) or polycarbonate (PC).

In one exemplary embodiment of the present invention, the fixing part may correspond to a key unit pressed by an external force so as to generate a control command. The key unit may include a key bracket fixed to the rear case and a pressing portion penetrating the opening part. Thus, an additional fixing structure may be unnecessary.

In one exemplary embodiment of the present invention, the opening part may include a pair of holes facing each other. The fixing part may include a pair of earphone units disposed in the pair of holes, respectively, which output auditory data. This symmetrical structure may allow the rear case and the front case to be fixed to each other.

In one exemplary embodiment of the present invention, the rear case may further include a band connected to the rear case. The rear case may include a fixing slit to which both ends of the band are fixed, which allows the band to be fixed to the rear case having higher rigidity without adding any additional structure to the front case.

Effects of the Disclosure

According to the present invention, a lightweight case can be implemented as a front case is made of polypropylene (PP) or polycarbonate (PC), or is formed with ribs including a plurality of holes. Further, since the front case and a rear case are connected to each other by a fixing part that penetrates a hole formed in the front case to perform a specific function, an additional fixing structure is unnecessary. Thus, a simple structure with minimized weight can be realized.

BEST MODE OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
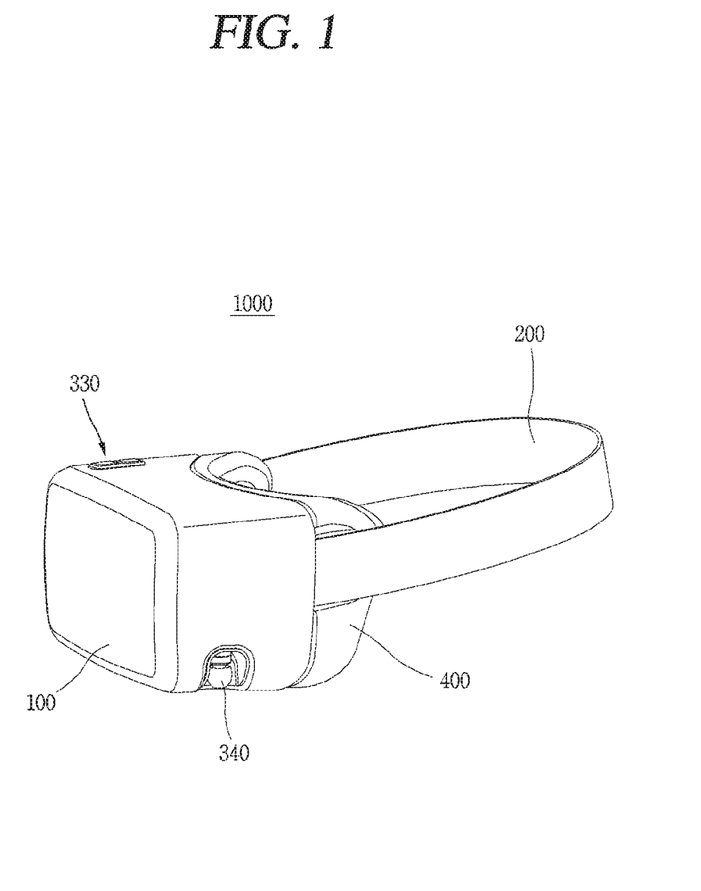
FIG. 1 is a view of a head mounted display (HMD) according to one embodiment of the present invention, viewed from one direction.

FIG. 1 is a view of a head mounted display (HMD) according to one embodiment of the present invention, viewed from one direction.

Referring to FIG. 1, an HMD 1000 according to the present invention includes a front case 100, a band 200, a rear case 300 (see FIG. 2A), and a pad 400.

The HMD 1000 is worn on a user's head by the band 200 in a manner of covering both eyes of the user. The front case 100 on which the rear case 300 is mounted is disposed on the user's both eyes. The pad 400 is coupled to the front case 100 so as to be in contact with a face of the user.

The rear case 300 includes a display unit for outputting images and a lens part (unit). The rear case 300 is placed on the front case 100 to block an inflow of light.

The front case 100 includes at least one opening part. The HMD 1000 includes at least one button portion fixed to the rear case 300 and passing through the opening part. The button portion passing through the opening part prevents the front case 100 from being separated from the rear case 300.

The button portion according to the present invention corresponds to an electronic component that performs a specific function. That is, the button portion is an input unit for generating a control command. For example, the button portion may correspond to a physical button/key pressed by a user to generate a control signal, a rotation key for adjusting a position of the lens unit, and the like. The button portion is fixed to the rear case 300 to perform a specific function, and corresponds to a component passing through the front case 100.

Meanwhile, in the HMD 1000, instead of the button portion, an earphone unit 340, which is an acoustic output device for outputting auditory data, may be fixed to the rear case 300 and disposed so as to penetrate the front case 100. That is, the earphone unit 340 may act as a fixing part for fixing the rear case 300 and the front case 100 together.

Hereinafter, components of the HMD 1000 according to the present invention will be described in detail.

Figure 2A:
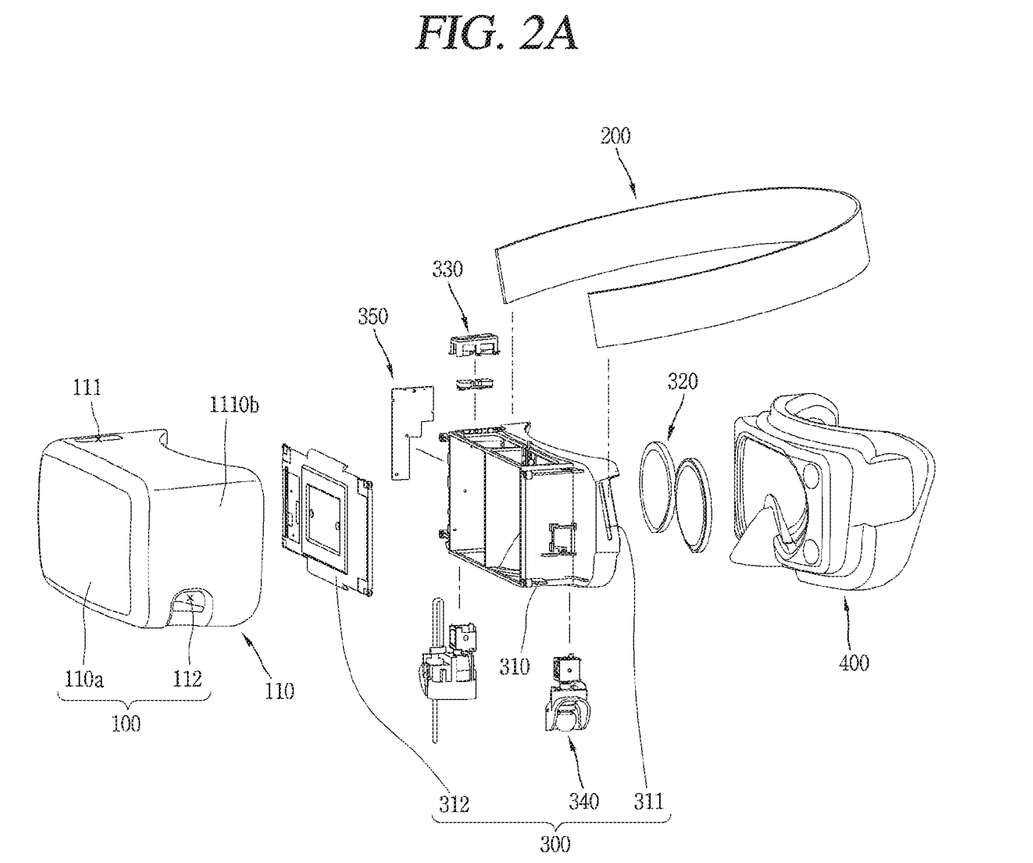
FIG. 2A is an exploded view of an HMD of FIG. 1.
Figure 2B:
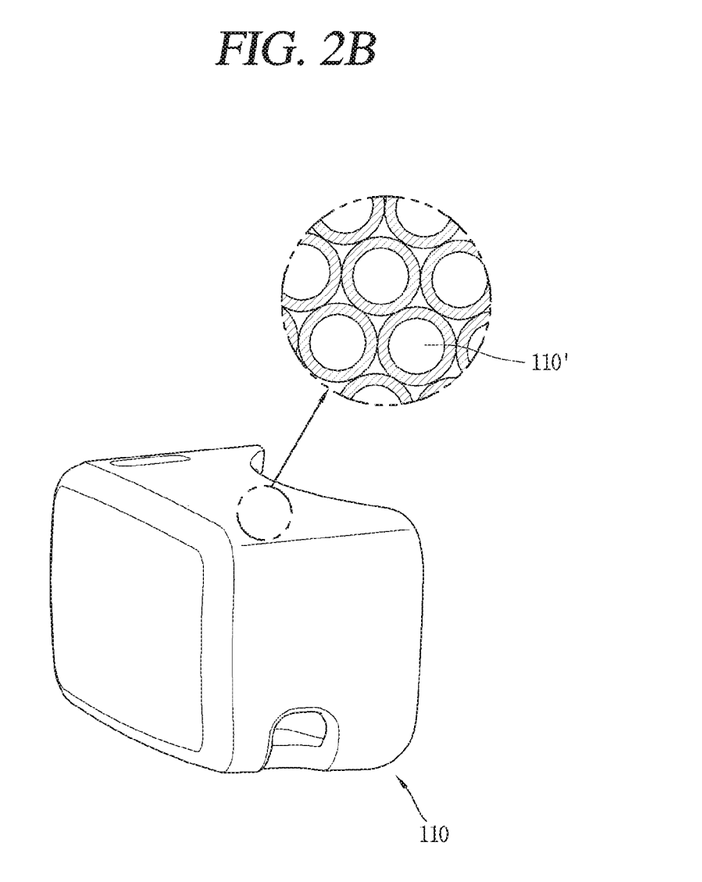
FIG. 2B is a conceptual view illustrating a material of a front case in accordance with one embodiment of the present invention.

FIG. 2A is an exploded view of an HMD of FIG. 1, and FIG. 2B is a conceptual view illustrating a material of a front case in accordance with one embodiment of the present invention.

Referring to FIGS. 1 and 2A, the rear case 300 is inserted into the front case 100, and both ends of the band 200 are connected to the rear case 300. The pad 400 is fixed to the front case 100 so as to cover the rear case 300 while the rear case 300 is mounted on the front case 100.

The rear case 300 mounted on the front case 100 includes a body 310, a lens unit 320, a key unit 330, an earphone unit 340, a circuit board 350, and a body cover 312.

The body 310 is provided with an inner space, and the lens unit 320 includes a pair of lenses corresponding to both eyes and is disposed in the inner space of the body 310. Although not shown in the drawings, a display unit for outputting images is provided in the inner space of the body 310. The display unit and the lens unit 320 are spaced apart from each other with a predetermined distance therebetween. The display unit may be disposed on the body cover 312. While the body cover 312 is mounted on the body 310, the body 310 is disposed in an inner space of the front case 100.

The rear case 300 further includes a key unit 330, an earphone unit 340 and a circuit board 350, which are placed on the body 310. The circuit board 350 is disposed on one surface of the rear case 300 and processes control signals of electronic components.

The key unit 330 is disposed on one side of the body 310, and the one side corresponds to one surface covered by the front case 100. A pair of earphone units 340 are disposed on the body 310 with some spacing therebetween. It is preferable that the pair of earphone units 340 are disposed symmetrically with respect to a central part of the body 310. The pair of earphone units 340 and the key unit 330 are formed to penetrate the front case 100.

The front case 100 includes a first surface 110a disposed so as to cover a visual field of a user while the HMD 1000 is worn on a user's head, and a second surface 110b formed to cover edges of the first surface 110a. The first surface 110a may have a rectangular shape, but the shape is not limited thereto.

The second surface 110b is formed to have a predetermined width. The second surface 110b allows the rear case 300 to be placed on the front case 100. The inner space of the front case 100 is defined by the first and second surfaces 110a, 110b.

The front case 100 includes an opening part. The opening part includes a first hole 111 and a second hole 112 formed on the second surface 110b.

An end portion of the key unit 330 is fixed to the body 310. The remaining portion of the key unit 330 passes through the first hole 111 to be exposed to outside of the front case 100. The remaining portion of the key unit 330 may protrude from an outer surface of the front case 100, but the present invention is not limited thereto. The key unit 330 is exposed through the first hole 111 of the front case 100 so as to be pressed by a user. When the key unit 330 is pressed, a control command is generated.

Meanwhile, the front case 100 includes a pair of second holes 112, and one region of each of the pair of earphone units 340 is mounted on the pair of second holes 112, respectively. The pair of second holes 112 are arranged to face each other.

The one region of the earphone unit 340 is fixed to the body 310, and the remaining region of it is inserted into the second hole 112 so that the front case 100 and the rear case 300 are connected to each other.

Meanwhile, the rear case 300 includes a pair of connecting holes 311. The connecting holes 311 are formed to face each other so that both ends of the band 200 are fixed. The pair of connecting holes 311 of the rear case 300 are covered by the front case 100.

The pair of connecting holes 311 may be formed adjacent to the pair of earphone units 340, respectively. That is, the rear case 300 and the front case 100 are fixed by the pair of earphone units 340, and the band 200 worn on the user's head is connected to the rear case 300.

The pad 400 is mounted on the front case 100 so as to cover the rear case 300, and forms an outer appearance (exterior) of the HMD 1000 together with the front case 100.

According to this embodiment of the present invention, the front case 100 and the rear case 300 are fixed to each other by the key unit 330 and the earphone unit 340 passing through the first and second holes 111, 112, respectively. Accordingly, additional fixing structure is unnecessary. Thus, the front case structure can be simple, and weight can also be minimized.

Referring to FIG. 2B, the front case 100 is made of polypropylene (PP) or polycarbonate (PC). The front case 100 is made of a material converted into a foaming agent by injecting air into polypropylene (PP) or polycarbonate (PC).

Since the material is put into an injection molding machine to inject steam, and is then pressurized so as to form a shape, an air region 110' into which the air is injected is formed.

Although not shown in the drawings, an exterior of the front case 100 made of polypropylene (PP) or polycarbonate (PC) may have irregularities on its surface. So, a process such as polishing (barrel, sanding), NC processing, and the like is performed so as to realize a smooth surface of the front case 100.

Figure 3:
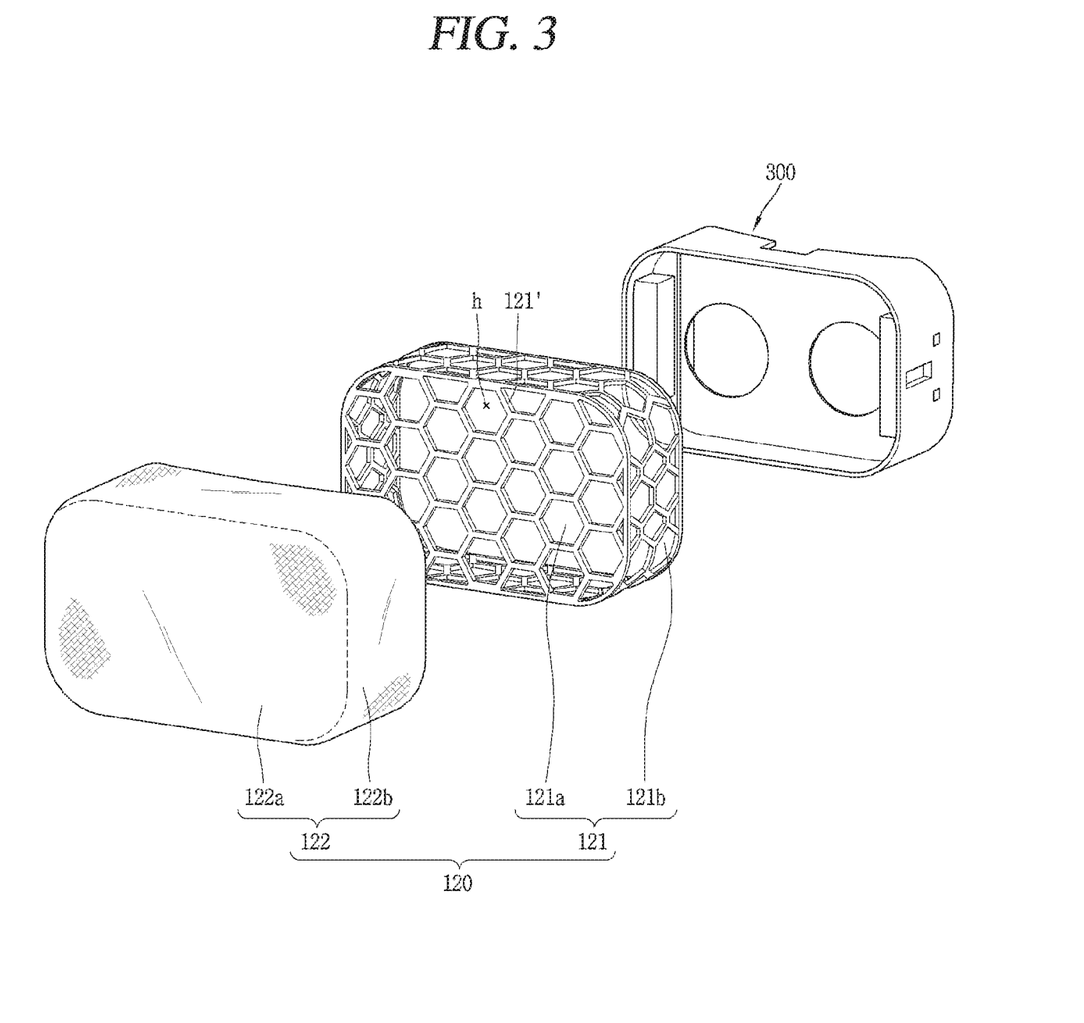
FIG. 3 is an exploded view of a front case in accordance with another embodiment of the present invention.

FIG. 3 is an exploded view of a front case in accordance with another embodiment of the present invention.

A front case 120 of FIG. 3 includes a support part 121 and a cover 122. The cover 122 is covered over an outer surface of the support part 121 to block an inflow of light, and the rear case 300 is placed on an inner space defined by the support part 121.

The support part 121 includes a plurality of ribs 121' forming a plurality of holes h. The plurality of ribs 121' form a hole h having a predetermined shape. The plurality of ribs 121' form a front portion 121a and a side portion 121b. The front portion 121a and the side portion 121b are formed, respectively, to be assembled each other. The support part 121 may be made of a PC material.

The cover 122 includes a first cover portion 122a and a second cover portion 122b formed to cover the front portion 121a and the side portion 121b. The cover 122 is made of a fabric. The cover 122 blocks light entering through the plurality of holes h. The front portion 121a and the side portion 121b are sewn together, which may prevent wrinkles on the cover 122 of the outer surface of the front case 120 from forming.

According to this embodiment, weight of the front case 120 may be minimized since the support 121 is made of ribs.

Figure 4A:
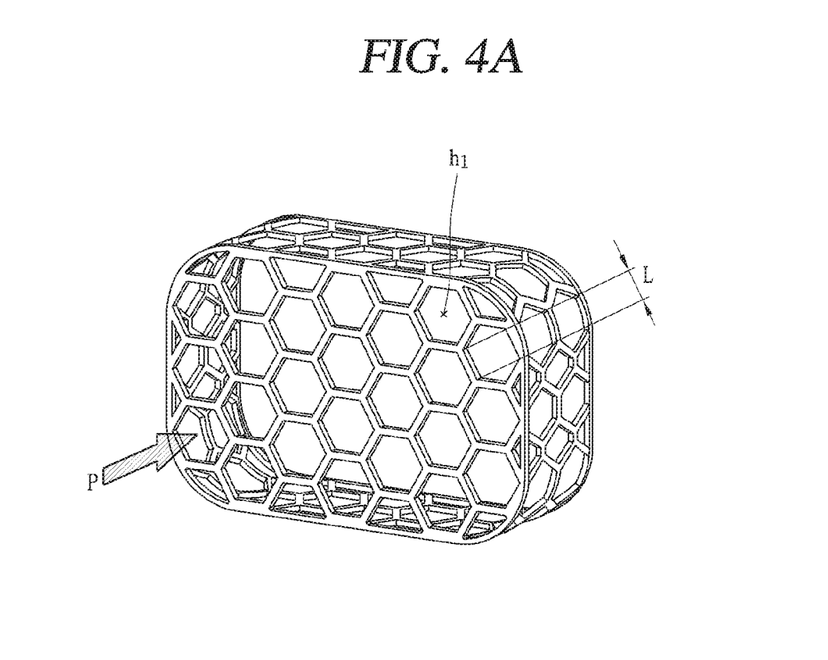
FIGS. 4A to 4B are conceptual views illustrating a rib shape forming a support part.
Figure 4B:
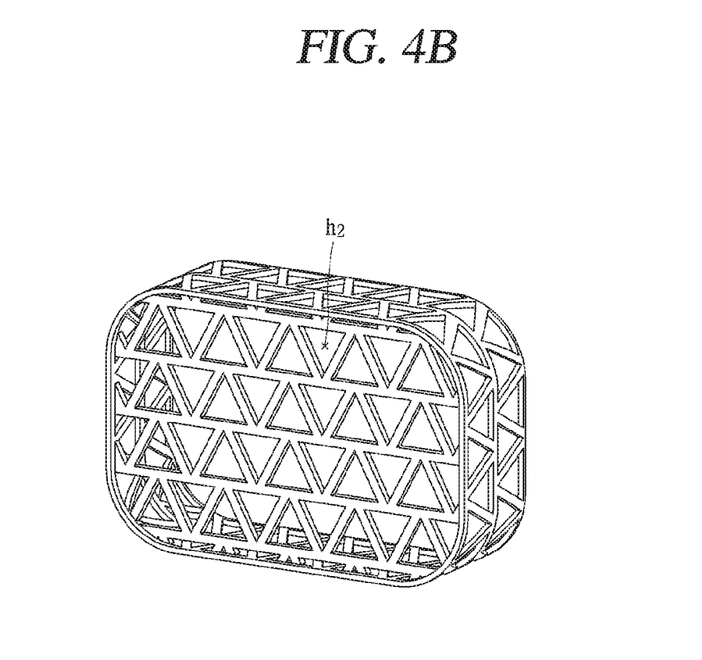

FIGS. 4A to 4B are conceptual views illustrating a rib shape forming a support part.

A hole h1 of the support part according to FIG. 4A has a hexagonal shape. The hole h1 is made up of six ribs. Equation 1 is for measuring rigidity when three ribs are connected. 'L' is a length of each rib, 'P' is an applied load, 'E' is an elastic modulus (modulus of elasticity) of a material, 'I' is a moment of inertia (second moment of area, or area moment of inertia), and 'δ' is a degree of deflection.

$$\delta = \frac{PL^3}{12EI} \quad \text{[Equation 1]}$$

$$\delta = \frac{PL^3}{6EI} \quad \text{[Equation 2]}$$

Equation 2 is for measuring rigidity when two ribs are connected. That is, as the length of the ribs increases, the degree of deflection increases, and rigidity against an external force increases as more ribs are connected to each other at one point.

A hole h2 of the support part according to FIG. 4B has a triangular shape. Four or five ribs meet at one point, but holes formed by the plurality of ribs may have different shapes.

In the drawings, the holes of the support part according to one embodiment are illustrated as one uniform shape, but the shape is not limited thereto. Different shapes of holes may be implemented in different regions of the support part. That is, a degree of load distribution may be variously implemented according to the shape (structure) of ribs forming the holes. A lightweight support part having a low degree deflection may be realized by a rib structure suitable for load distribution.

Figure 5A:
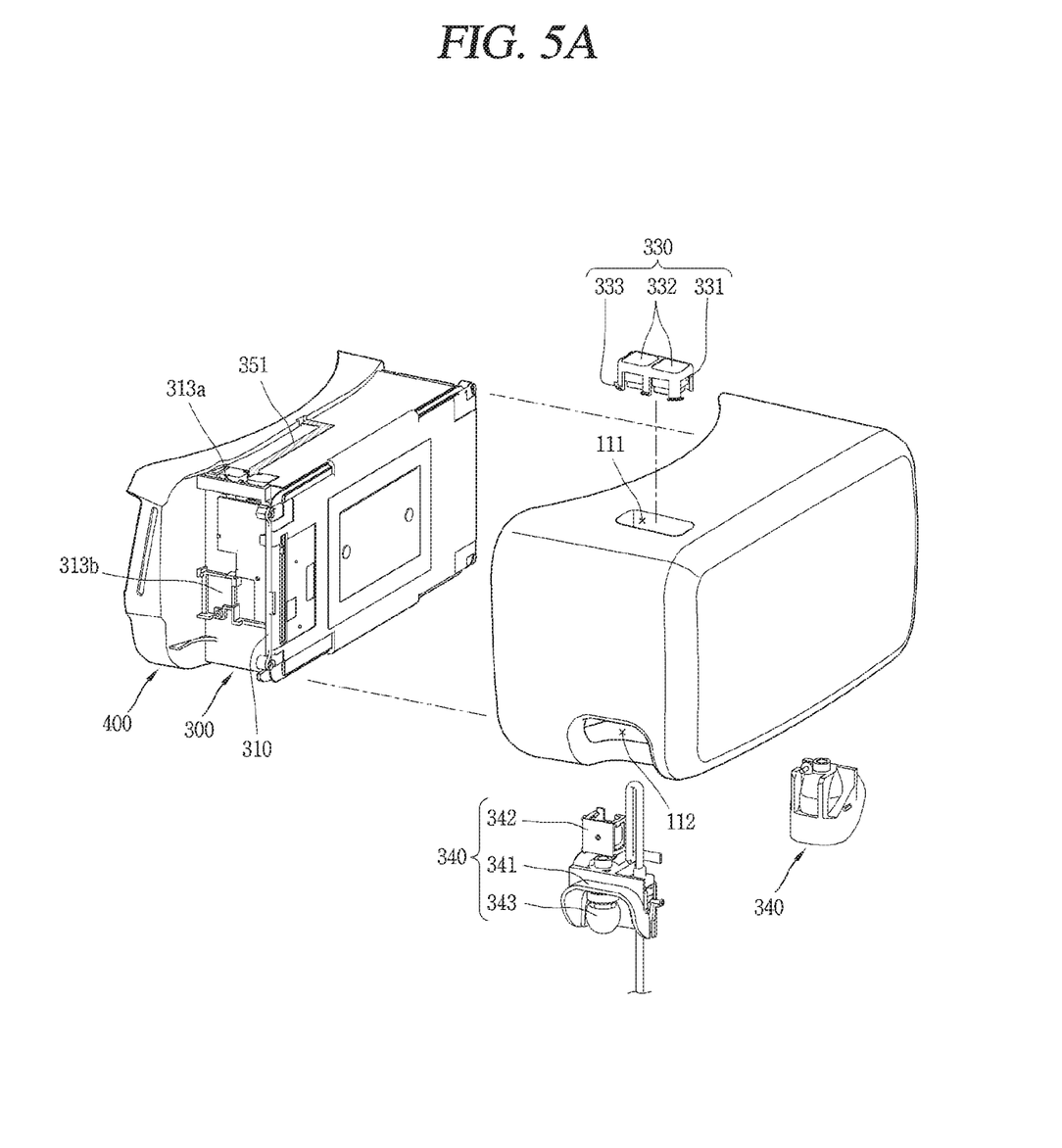
FIG. 5A is a partial exploded view illustrating a fixing part for fixing a rear case to a front case.
Figure 5B:
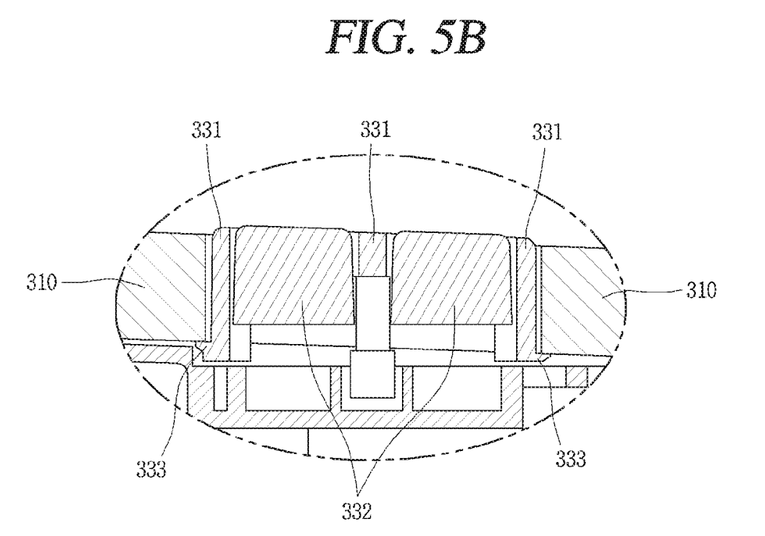
FIG. 5B is a conceptual view illustrating a structure of a key unit.

FIG. 5A is a partial exploded view illustrating a key unit for fixing a rear case to a front case. FIG. 5B is a conceptual view illustrating a structure of a key unit.

Referring to FIGS. 5A and 5B, the key unit 330 is inserted into the first hole 111. The key unit 330 includes a key bracket 331, a pressing portion 332, and a locking portion 333. The key bracket 331 is placed on a first mounting region 313a of the rear case 300. The key bracket 331 passes through the first hole 111, and an outer circumference of the key bracket 331 may be substantially the same size as of the first hole 111. The locking portion 333 extends from the key bracket 331 so as to be locked into the front case 100. Accordingly, the key unit 330 is not separated from the front case 100.

The pressing portion 332 is movably mounted on the key bracket 331. The pressing portion 332 is moved by an external force and generates a control command. As the key bracket 331 for fixing the pressing portion 332 is fixed to the first hole 111, the rear case 300 and the front case 100 may be stably fixed to each other even when the pressing portion 332 moves.

Meanwhile, the pair of earphone units 340 are fixedly inserted into the pair of second holes 112, respectively.

Each of the earphone units 340 includes a control module 342 mounted on a second mounting area 313b of the rear case 300, a housing 341 fixed to the control module 342 and fixedly inserted into the second hole 112, and an earphone module 343 placed on the housing 341 and electrically connected to the control module 342. The earphone module 343 and the control module 342 are connected by an electric wire, and the earphone module 343 is drawn out from the housing 341 to be worn in user's ears.

The housing 341 is fixed to the second hole 112 even the earphone module 343 is drawn out from it. The housing 341 and the control module 342 are fixed to each other thereby, preventing the rear case 300 from being separated from the front case 100.

The pair of second holes 112 are disposed to face each other and, preferably, arranged farthest apart from each other.

The rear case 300 may be fixed to the front case 100 by the key unit 330 and the earphone module 340 fixed to the first and second holes 111, 112.

Figure 6:
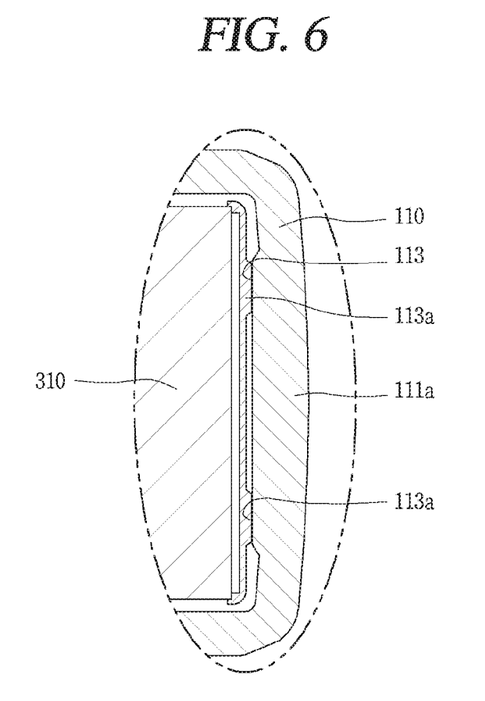
FIG. 6 is a partial sectional view illustrating a bonding structure between a front case and a rear case of FIG. 2A.

FIG. 6 is a partial sectional view illustrating a bonding structure between a front case a rear case of FIG. 2A.

Referring to FIGS. 2A and 6, an adhesive guide portion 113 is formed between the first surface 110a of the front case 100 and the rear case 300. The adhesive guide portion 113 may be integrally formed with the rear case 300.

The adhesive guide portion 113 may include at least one adhesive surface 113a protruding toward the front case 100. The adhesive surface 113a and an inner surface of the first surface 110a are adhered to each other. An adhesive layer may be formed on the adhesive surface 113a.

The front case 100 and the rear case 300 may be more stably fixed to each other since the rear case 300 and the front case 100 are adhered to each other by the adhesive guide portion 113. An area where the adhesive guide portion 113 is formed is not limited to the area described above, and may be formed on a surface where the rear case 300 and the front case 100 face each other.

Figure 7:
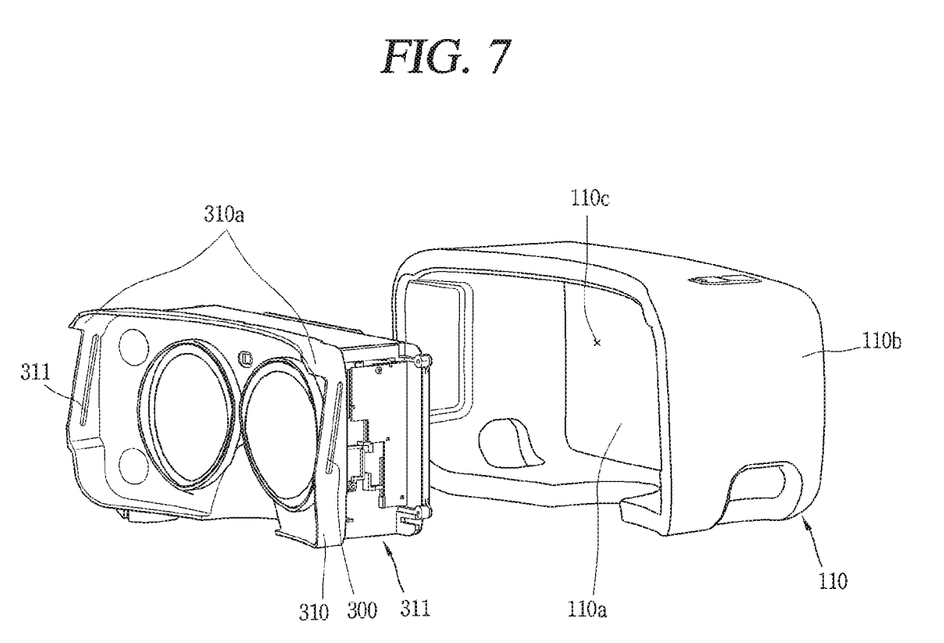
FIG. 7 is a conceptual view illustrating a structure of a reinforcement portion of a rear case.

FIG. 7 is a conceptual view illustrating a structure of a reinforcement portion.

The rear case 300 has the lens unit 320 mounted on one surface thereof, and is coupled to the front case 100 so that another surface of the rear case 300, which faces the one surface, is placed on the front case 100.

Meanwhile, the rear case 300 further includes a reinforcement portion 310a protruding from the one surface. The reinforcement portion 310a protrudes along a part of edges of the one surface, and has a predetermined width.

The reinforcement portion 310a is formed to support edges of the front case 100. That is, the reinforcement portion 310a is formed to overlap with one region of the front case 100, thereby preventing the edges of the front case 100 from being damaged by an external force.

Figure 8A:
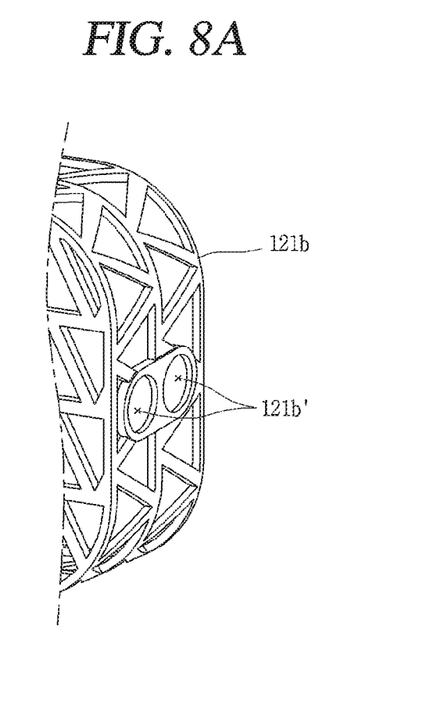
FIGS. 8A and 8B are views illustrating a key unit of a front case of FIG. 3.
Figure 8B:
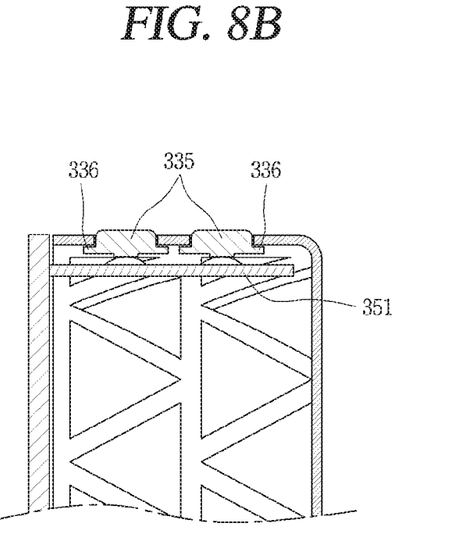

FIGS. 8A and 8B are views illustrating a key unit of a front case of FIG. 3.

Referring to FIG. 8A, the support part 121 made up of the plurality of ribs forms a keyhole 121b' through which at least a part of the key unit passes. The rear case 300 is provided with a circuit board 351 including a dome switch. A pressing portion 335 penetrating the keyhole 121b' is disposed so as to press the dome switch. The pressing portion 335 may include a locking portion 336 so as not to be separated from the keyhole 121b'.

According to the embodiments, a lightweight case can be implemented as a front case is made of polypropylene (PP) or polycarbonate (PC), or is formed with ribs including a plurality of holes. Further, since the front case and the rear case are connected to each other by the key unit that performs a specific function by passing through a hole formed in the front case or by the earphone unit, an additional fixing structure is unnecessary. Thus, a simple structure with minimized weight can be realized.

Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

INDUSTRIAL AVAILABILITY

The present invention relates to a head mounted display without an additional fixing structure. Therefore, the present invention can be utilized in various relevant industrial fields.

The invention claimed is:

1. A head mounted display (HMD) comprising:
a rear case for accommodating a lens unit;
a front case coupled to the rear case to form an outer appearance and provided with an opening part; and
a key unit fixed to the rear case and configured to be pressed by an external force to generate a control command,
wherein the key unit includes a key bracket fixed to the rear case, and a pressing portion mounted on the key bracket in a pressable manner and penetrating the opening part,
wherein the front case is made of polypropylene (PP) or polycarbonate (PC),
wherein the front case includes a support part and a cover,
wherein the support part includes a plurality of ribs forming a plurality of holes,
wherein the plurality of ribs form a front portion and a side portion of the support part, and
wherein the front portion and the side portion are sewn together, preventing wrinkles forming on an outer surface of the cover of the front case.

2. The head mounted display of claim 1, wherein the key bracket includes a side wall portion fitted to the opening part and a locking portion protruding from the side wall portion and supported by the front case.

3. The head mounted display of claim 1, wherein the opening part includes a pair of holes formed to face each other, and
wherein the head mounted display further includes a pair of earphone units disposed in the pair of holes, respectively, and outputting auditory data.

4. The head mounted display of claim 3, wherein each of the pair of earphone units includes:
a control module mounted on the rear case;
a housing fixed to the control module and formed to be fitted into the pair of holes; and
an earphone module electrically connected to the control module and disposed on the housing in an attachable and detachable manner.

5. The head mounted display of claim 1, further comprising a band connected to the rear case,
wherein the rear case includes a fixing slit to which both ends of the band are fixed.

6. The head mounted display of claim 1, wherein the lens unit is mounted on one surface of the rear case, and
wherein the front case is provided with a reinforcement portion protruding from the one surface so as to support at least a part of edges of the front case.

7. The head mounted display of claim 1, further comprising an adhesive guide portion formed between the rear case and the front case,
wherein the adhesive guide portion protrudes toward the front case and includes at least one adhesive surface adhered to the front case, and
wherein the adhesive guide portion is formed integrally with the rear case.

8. The head mounted display of claim 1, wherein the plurality of holes include hexagonal-shaped holes.

9. The head mounted display of claim 1, wherein the plurality of holes include triangular-shaped holes.

10. The head mounted display of claim 1, wherein the support part is made of polycarbonate (PC).

11. The head mounted display of claim 10, wherein the cover is made of a fabric.

12. The head mounted display of claim 1, wherein the cover includes a first cover portion configured to cover the front portion and a second cover portion configured to cover the side portion.

13. The head mounted display of claim 1, wherein the cover is covered over an outer surface of the support part.

14. The head mounted display of claim 13, wherein the cover is configured to block light entering through the plurality of holes.

15. The head mounted display of claim 1, wherein the rear case is placed on an inner space defined by the support part.

16. The head mounted display of claim 1, wherein the support part made up of the plurality of ribs forms a keyhole through which at least a part of the key unit passes.

* * * * *